Aug. 17, 1954     E. O. SCHWEITZER, JR     2,686,898
ELECTRIC MEASURING INSTRUMENT
Filed Aug. 10, 1949     2 Sheets-Sheet 1
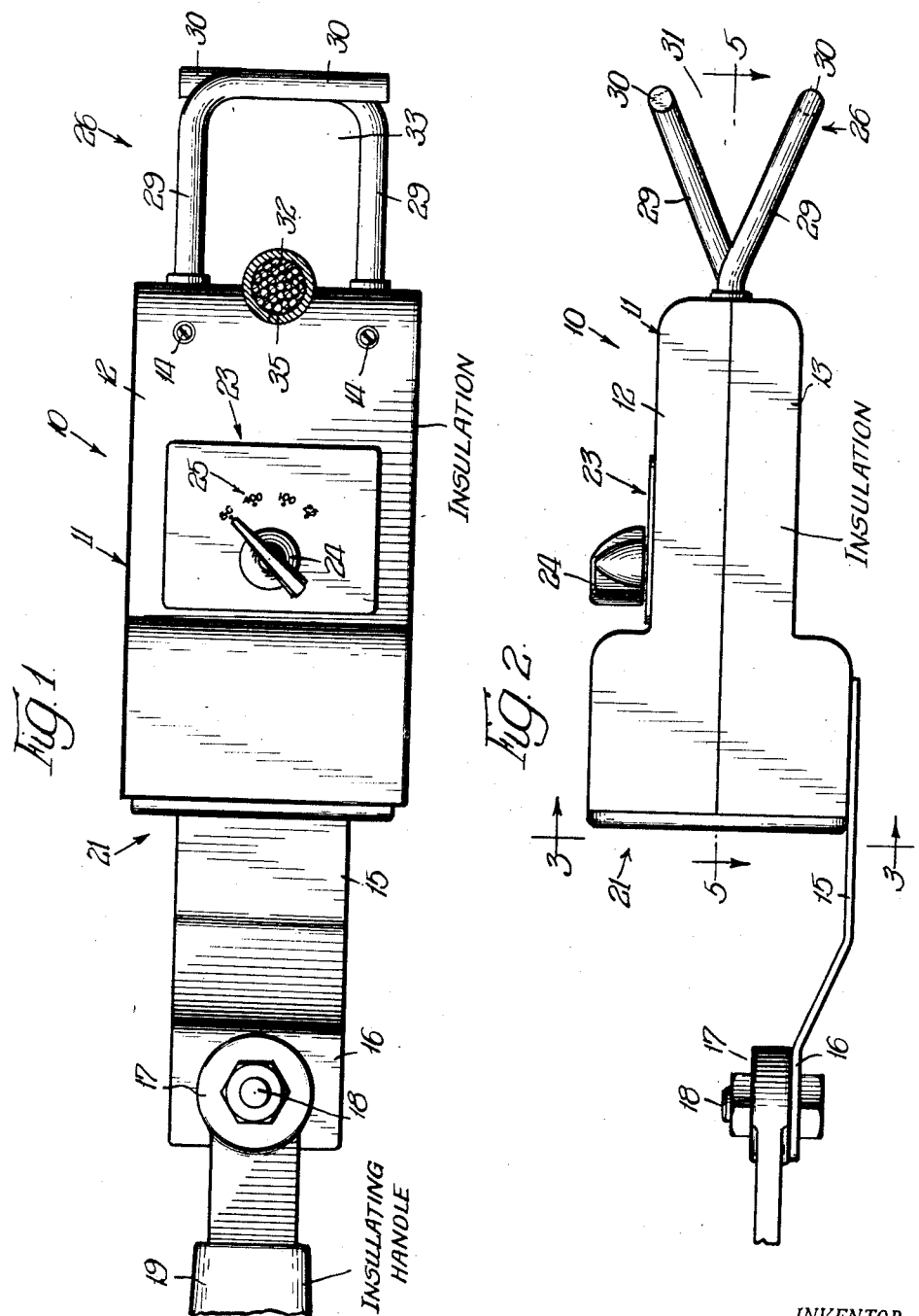
INVENTOR.
Edmund O. Schweitzer, Jr.,
BY Robert R. Lockwood
atty Aug. 17, 1954
E. O. SCHWEITZER, JR
2,686,898
ELECTRIC MEASURING INSTRUMENT
Filed Aug. 10, 1949
2 Sheets-Sheet 2
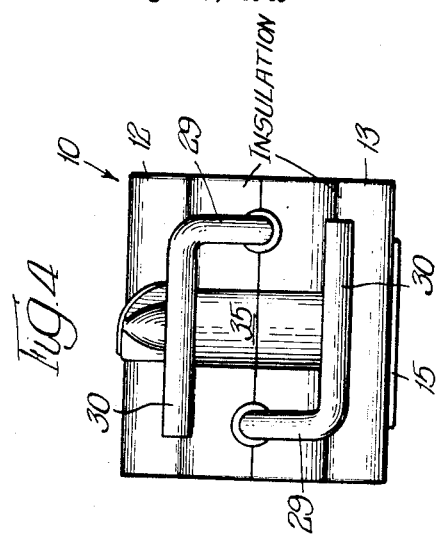
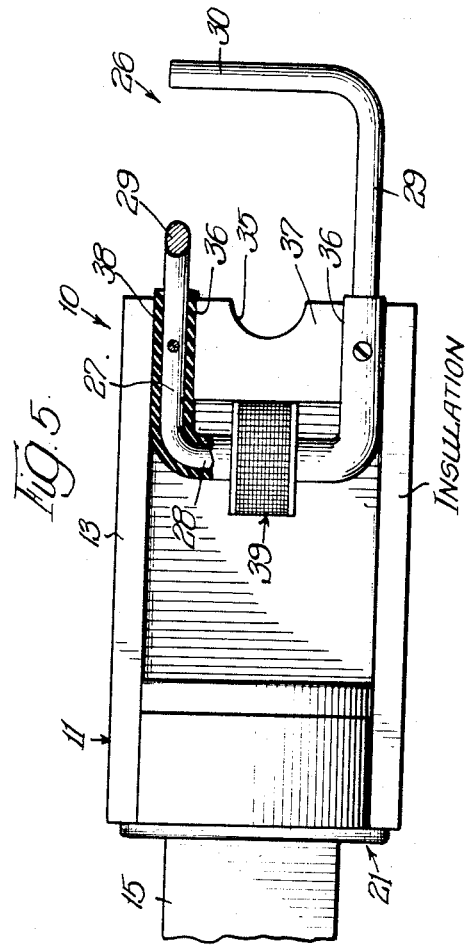
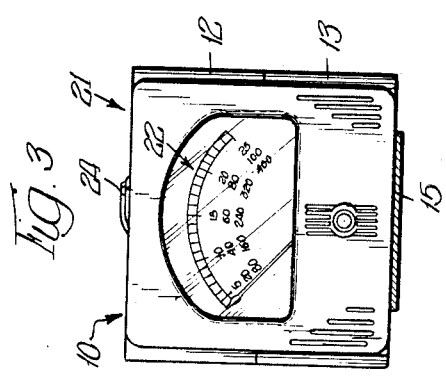
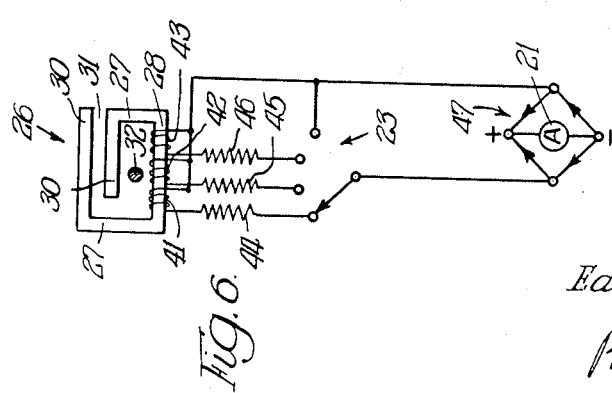
INVENTOR.
Edmund O. Schweitzer, Jr.,
BY
Robert R. Lockwood
ATTY Patented Aug. 17, 1954

2,686,898

UNITED STATES PATENT OFFICE 2,686,898

ELECTRIC MEASURING INSTRUMENT

Edmund O. Schweitzer, Jr., Northbrook, Ill., assignor to E. O. Schweitzer Manufacturing Co., Inc., Northbrook, Ill., a corporation of Illinois Application August 10, 1949, Serial No. 109,537

4 Claims. (Cl. 324—127)

My invention relates, generally, to electric measuring instruments, and it has particular relation to improvements in the electrical measuring apparatus disclosed in my Patent No. 2,375,591, issued May 8, 1945.

In my patent there is disclosed means for measuring the current flow in a high voltage conductor. For example, the device may be employed for measuring the flow of alternating current in a conductor which is maintained at and above a voltage of 2300 volts. The device comprises a specially arranged magnetic core structure having a fixed air gap therein through which the conductor can be moved into the measuring position. The core structure is carried at the end of an insulating handle which serves to protect the lineman using the instrument from the effects of the high voltage maintained on the conductor. A winding links the magnetic core structure and is connected to a suitable measuring instrument by means of which the current flowing in the conductor can be indicated. As set forth above, the present invention has to do with certain improvements in the structure previously disclosed in my patent.

Among the objects of my invention are: To arrange the core structure so that the arms which define the slot for receiving the conductor, the current flow through which is to be measured, are located in a plane normal to the plane containing the core side members and their connecting sections; to locate the conductor in a predetermined position in the window of the core structure; to position the core structure in a case and detachably mount the same on one end of an insulating handle; to position the scale of a meter at an angle to the longitudinal axis of the handle and case; and to mount the core structure in the case so that it is unnecessary to maintain a close tolerance therebetween.

Other objects of my invention will, in part, be obvious and in part appear hereinafter.

My invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of my invention reference can be had to the following detailed description, taken together with the accompanying drawings, in which:

Figure 1 is a top plan view of an electrical measuring instrument constructed in accordance with my invention and showing how it can be mounted detachably at one end of an insulating handle;

Figure 2 is a view, in side elevation, of the instrument shown in Figure 1;

Figure 3 is a detailed sectional view, taken along the line 3—3 of Figure 2;

Figure 4 is a view, in end elevation, of the instrument as shown in Figure 2;

Figure 5 is a detail sectional view taken generally along the line 5—5 of Figure 2; and Figure 6 illustrates diagrammatically the circuits which may be used in practicing my invention as disclosed herein.

Referring now particularly to Figures 1 and 2 of the drawings, it will be observed that the reference character 10 designates, generally, an electric measuring instrument constructed in accordance with my invention. The instrument 10 includes an insulating case, shown generally at 11, which may be made up of upper and lower case sections 12 and 13. The sections 12 and 13 may be formed initially in identical shape of suitable insulating material such as a phenolic condensation product or other plastic. The case sections 12 and 13 may be suitably drilled and tapped as may be required for assembly purposes. They may be held together, in part, by screws 14.

The insulating case 11 is arranged to be carried by a plate 15 which may be suitably secured to the underside of the lower case section 13. The plate 15 has an offset support portion 16 for receiving a fitting 17 that is detachably secured thereto by a bolt 18. The offset support portion 16 may be slotted to receive teeth which extend from the fitting 17 and serve to interlock the two parts together when the nut is tightened on the bolt 18. It will be understood that the fitting 17 is located on one end of an insulating handle 19 which may be formed of wood or other recognized insulating material which is employed by linemen in working on energized high voltage lines. Preferably the fitting 17 is a standard fitting which is adapted to cooperate with other instruments, such as saws, wrenches and the like, used by linemen in working on energized high voltage lines.

For the purpose of indicating the current flow a meter, shown generally at 21, is provided in the enlarged left hand ends of the upper and lower case sections 12 and 13. The meter 21 is of conventional construction and it has a scale 22, Figure 3, which is positioned at right angles to the longitudinal axis of the case 11 and also to the longitudinal axis of the stick carrying the fitting 17 at its upper end. This arrangement facilitates the reading of the position of the pointer with respect to the scale marking when the instrument 10 is held overhead in operative position with respect to a conductor the current flowing through which is to be measured.

With a view to adjusting the instrument 10 for measuring different magnitudes of current, a selector switch, shown generally at 23, is provided having a handle 24 which extends above the upper case section 12. As will appear hereinafter, the selector switch 23 is arranged to make different connections depending upon the current range which is to be measured. A scale, shown generally at 25 in Figure 1, indicates the particular scale on the meter 21 which is to be read for a given switch position.

At the end of the case 11 opposite the meter 21 there is provided a generally rectangular magnetic core structure which is indicated at 26. The core structure 26 is formed by a rod of suitable magnetic material having a circular cross section. It is shaped to include side members 27 which are joined together by a connecting section 28. It will be understood that the side members 27 and connecting section 28 are coplanar and that they are located within the right hand end of the case 11 as it is viewed in Figures 1, 2 and 5 of the drawings. Side member portions 29 extend from the side members 27 in opposite directions as shown more clearly in Figures 2 and 4 of the drawings. The purpose of this construction is to support arms 30 in spaced apart relation in a plane which is generally normal to the plane containing the side members 27 and connecting section 28. Between the spaced apart arms 30 a permanent entrance slot 31, Figure 2, is formed for receiving a conductor 32, Figure 1, through which alternating current is flowing. It will be understood that the instrument 10 is placed in operative position with respect to the conductor 32 by first placing the spaced apart arms 30 parallel thereto and then moving the instrument bodily so that the conductor 32 occupies a position below the arms 30. Thereafter the instrument 10 is rotated bodily through ninety degrees so that it extends at right angles to the window 33 which is provided through the core structure 26. In order to place the conductor 32 in a predetermined position with respect to the magnetic core structure 26 so that uniform results are obtained, centering means in the form of a groove 35 is provided in the end of the insulating case 11 as shown more clearly in Figures 1 and 5 of the drawings. The groove 35 is semicircular in cross section and its diameter is large enough to receive the maximum diameter conductor which is likely to be encountered. It serves to center the conductor within the magnetic core structure 26 automatically and without requiring particular attention on the part of the lineman.

As indicated hereinbefore the magnetic core structure 26 is formed of magnetic material having a circular cross section. Semicircular grooves 36 are provided in the lower case section 13, as shown in Figure 5, for receiving the magnetic core structure 26. Similar grooves are provided in the upper case section 12 as will be understood readily. It is desirable to avoid the requirement of close tolerance between the dimensions of the magnetic core structure 26 and of the semicircular grooves 36 and their position in the lower case section 13. Also it is desirable to provide additional insulation for the magnetic core structure 26 over that which is provided by the insulating case 11 itself. For these purposes the semicircular grooves 36 are provided in an end wall 37 of the lower case section 13 of a diameter which is substantially greater than that of the side members 27. An insulating sleeve 38 of readily deformable material, such as rubber, is telescoped over the side members 27 and connecting section 28. Since the sleeve 38 is readily deformable a close tolerance need not be maintained between the dimensions of the magnetic core structure 26 and the size and positions of the semicircular grooves 36. Also, since the sleeve 38 may be formed of good insulating material, additional insulation is provided for the magnetic core structure 26 portions of which may come in contact with energized high voltage conductors.

Surrounding the connecting section 28 of the magnetic core structure 26 and the portion of the insulating sleeve 38 thereon are windings which are indicated, generally, at 39. As shown in Figure 6 the windings 39 comprise individual windings 41, 42 and 43 having different turns depending upon the current flow which is to be measured. Resistors 44, 45 and 46 are provided between the windings 41, 42 and 43 respectively and the stationary contacts of the selector switch 23 referred to previously. The movable contact of the switch 23 and the common connection to the windings 41, 42 and 43 are connected to a bridge type rectifier that is indicated, generally, at 47. The winding of the meter 22 is connected, as illustrated, across the opposite terminals of the rectifier 47 between which direct current flows.

For illustrative purposes the meter 22 has been indicated as being calibrated so as to read currents ranging upwardly to twenty-five, one hundred and four hundred amperes. Obviously other calibrations can be used as desired.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. A portable instrument for measuring the flow of alternating current in a high voltage conductor and adapted to be detachably mounted on the upper end of an insulating handle comprising, in combination, an elongated insulating case having a generally rectangular cross section, an elongated plate secured at one end to one side of said case near one end thereof and adapted at its other end to be clamped to said handle, said elongated plate being offset intermediate its ends to place the point of attachment thereof to said handle generally along the longitudinal axis of said case, a magnetic core structure extending centrally from the other end of said case providing a window for receiving said conductor and including a pair of oppositely extending spaced apart arms defining a permanently open entrance slot therebetween through which said conductor is adapted to enter said window, a measuring winding in said case linking said core structure, and a current responsive meter carried by said case at said one end with the scale thereof at right angles to the longitudinal axis of said case and connected for energization to said winding.

2. A transformer for measuring alternating current flow in a conductor comprising, in combination, a generally rectangular magnetic core structure providing a window for receiving said conductor and formed by a pair of side members having coplanar portions joined at one end by a connecting section and a pair of oppositely extending spaced apart arms at the other end defining a permanently open entrance slot therebetween through which said conductor is adapted to enter said window, said arms being disposed in a plane generally normal to the plane containing said coplanar portions of said side members, an insulating case supporting said coplanar portions of said side members with the remaining portions thereof projecting therefrom and having a groove extending through said window for receiving said conductor in a predetermined position therein, and a measuring winding linking said magnetic core structure for measuring the current flow in said conductor.

3. A transformer for measuring alternating current flow in a conductor comprising, in combination, a generally rectangular magnetic core structure providing a window for receiving said conductor and formed by a pair of side members having coplanar portions joined at one end by a connecting section and a pair of oppositely extending spaced apart arms at the other end defining a permanently open entrance slot therebetween through which said conductor is adapted to enter said window, the portions of said side members carrying said arms being located on opposite sides of the plane of said coplanar portions and extending in opposite directions to each other and positioning said arms in a plane generally normal to said plane containing said coplanar portions, an insulating case supporting said coplanar portions of said side members with the remaining portions thereof projecting therefrom and having a groove extending generally normal to said window for receiving said conductor in a predetermined position therein, and a measuring winding linking said magnetic core structure for measuring the current flow in said conductor.

4. A portable instrument for measuring the flow of alternating current in a high voltage conductor and adapted to be mounted on the upper end of an insulating handle comprising, in combination, an insulating case, means for mounting the same at one end on said handle, a magnetic core structure extending from the other end of said case providing a window for receiving said conductor and including a pair of oppositely extending spaced apart arms defining a permanently open entrance slot therebetween through which said conductor is adapted to enter said window, a sleeve of readily deformable insulation enclosing a portion of said core within said case whereby close tolerance between said case and core is not required, a measuring winding in said case linking said core structure, and a current responsive meter carried by said case and connected for energization to said winding for indicating the current flow in said conductor.

References Cited in the file of this patent
UNITED STATES PATENTS

| Number | Name | Date |
|---|---|---|
| 750,525 | Everest | Jan. 26, 1904 |
| 1,912,800 | Stanton | June 6, 1933 |
| 2,089,083 | Arey | Aug. 3, 1937 |
| 2,295,959 | Melville et al. | Sept. 15, 1942 |
| 2,323,996 | Hubbard | July 13, 1943 |
| 2,375,591 | Schweitzer, Jr. | May 8, 1945 |